(12) United States Patent
Rasmussen

(10) Patent No.: US 11,997,194 B2
(45) Date of Patent: May 28, 2024

(54) SPARSED MERKLE TREE METHOD AND SYSTEM FOR PROCESSING SETS OF DATA FOR STORING AND KEEPING TRACK OF THE SAME IN A SPECIFIC NETWORK

(71) Applicant: I25S ApS, Hellerod (DK)

(72) Inventor: Carsten Bleser Rasmussen, Hellerod (DK)

(73) Assignee: I25S ApS, Hellerod (DK)

(*) Notice: Subject to any disclaimer, the term of this patent is extended or adjusted under 35 U.S.C. 154(b) by 142 days.

(21) Appl. No.: 17/013,084

(22) Filed: Sep. 4, 2020

(65) Prior Publication Data
US 2021/0067330 A1 Mar. 4, 2021

(30) Foreign Application Priority Data
Sep. 4, 2019 (EP) .................................... 19020509

(51) Int. Cl.
*H04L 9/08* (2006.01)
*G06F 9/46* (2006.01)
*H04L 9/00* (2022.01)
*H04L 9/06* (2006.01)

(52) U.S. Cl.
CPC ............ *H04L 9/0836* (2013.01); *G06F 9/466* (2013.01); *H04L 9/0643* (2013.01); *H04L 9/50* (2022.05)

(58) Field of Classification Search
CPC ....... H04L 9/0836; H04L 9/0643; H04L 9/50; H04L 9/3239; H04L 67/104; H04L 67/1097; G06F 9/466; G06F 16/2246; G06F 16/214; G06F 16/2255; G06F 16/27
See application file for complete search history.

(56) References Cited

U.S. PATENT DOCUMENTS

| | | | |
|---|---|---|---|
| 9,916,203 B1* | 3/2018 | Pogde | ................. G06F 11/1448 |
| 2005/0038774 A1 | 2/2005 | Lillibridge | |
| 2007/0282915 A1* | 12/2007 | Vosshall | ................. G06F 16/219 |
| 2010/0076930 A1* | 3/2010 | Vosshall | ................ G06F 3/0604 |
| | | | 707/638 |
| 2014/0298010 A1* | 10/2014 | Ryan | ....................... G06F 21/45 |
| | | | 713/158 |
| 2018/0089041 A1* | 3/2018 | Smith | .................... H04L 9/3239 |
| 2019/0171825 A1* | 6/2019 | Khi | ........................ H04L 9/0643 |
| 2019/0349733 A1* | 11/2019 | Nolan | .................. H04L 41/0806 |
| 2019/0378162 A1* | 12/2019 | Goldberg | ........... G06Q 30/0242 |
| 2020/0126075 A1* | 4/2020 | Fisch | ................. G06F 21/6245 |
| 2020/0372015 A1* | 11/2020 | Baird, III | .................. H04L 9/50 |

(Continued)

OTHER PUBLICATIONS

Rasmus Dahlberg, et al "Efficient Sparse Merkle Trees: Caching Strategies and Secure (Non-)Membership Proofs", IACR, International Association for Cryptologic Research, vol. 20160831:073914, Aug. 31, 2016 (Year: 2016).*

(Continued)

*Primary Examiner* — Taghi T Arani
*Assistant Examiner* — Blake I Narramore
(74) *Attorney, Agent, or Firm* — Jose Cherson Weissbrot

(57) ABSTRACT

The computer-implemented method for processing sets of data for storing and keeping track of the same in a specific network implements a Sparsed Merkle tree. The method includes dividing at least one of the hash values into multiple sections of rim-keys of a given bit-width; and determining leave rim-keys being archive leaves of the Sparsed Merkle tree, and parent rim keys supporting the creation of a subtree.

12 Claims, 5 Drawing Sheets

(56) References Cited

U.S. PATENT DOCUMENTS

2020/0380154 A1* 12/2020 Jayachandran ....... H04L 9/3239
2020/0382315 A1* 12/2020 Lakk ..................... H04L 9/3247
2020/0394154 A1* 12/2020 Blackshear ............... H04L 9/50
2020/0394159 A1* 12/2020 Hurley ................. G06Q 20/389
2020/0394181 A1* 12/2020 Winarski ............ G06F 16/2246
2021/0064584 A1*  3/2021 Assadipour ........... H04L 9/0637
2022/0078006 A1*  3/2022 Krishnamurthy ......... H04L 9/50

OTHER PUBLICATIONS

Rasmus Dahlberg, et al "Efficient Sparse Merkle Trees: Caching Strategies and Secure (Non-)Membership Proofs", IACR, International Association for Cryptologic Research, vol. 20160831:073914, Aug. 31, 2016, pp. 1-16 XP061021676, Figures 2, 3, 6, Sections 3 and 5.2.

* cited by examiner

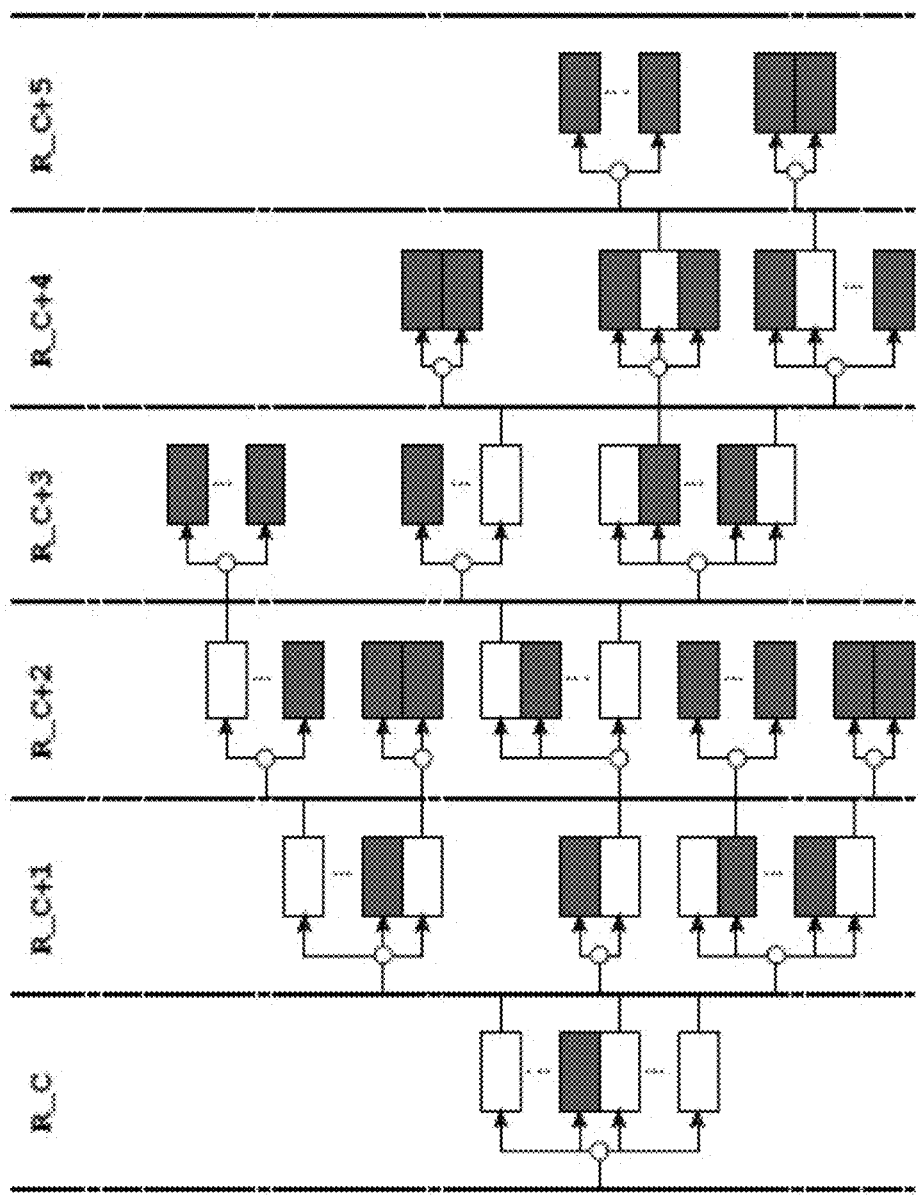
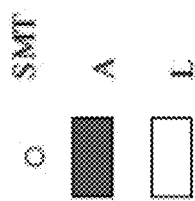
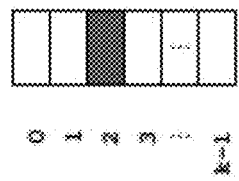
FIG. 2A
FIG. 2B

SPARSED MERKLE TREE METHOD AND SYSTEM FOR PROCESSING SETS OF DATA FOR STORING AND KEEPING TRACK OF THE SAME IN A SPECIFIC NETWORK

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of data-storage management in databases, in particular for databases of transactions. The transactions may be relating to cryptocurrencies, such as blockchain transactions. The invention relates more particularly to storing and keeping track of transactions in a specific network.

2. Description of Related Art Including Information Disclosed Under 37 CFR 1.97 and 37 CFR 1.98

When the number of transactions is high, the transactions should be highly secured. This raises an issue of the safe and optimal storage of the data.

One solution provided in the prior art is using Merkle trees. The Merkle trees enable cryptographically committing to a set of data. Each piece of data in the set is first hashed, and then the hashing is done again to all the data and all the way up the tree until a root node is obtained. In the illustration of FIG. 1, each data such as a transaction (TA, TS, TX, TZ), is hashed to obtain a hash of the transaction (H(TA), H(TS), H(TX), H(TZ)). Then, consecutive hashes ((H(TA), H(TS)) are hashed together to obtain another hash value (H (H(TA) ∥ H(TS)) ..., and so on and so forth until reaching the root node (H(H((H(TA) ∥ H(TS)) ∥ H(H(TX) ∥ H(TZ))))).

The root of this tree is a hash. It can be used to show what has been called the Merkle proof, i.e. prove that some content is part of the tree. This is generally called the Proving Inclusion. For example, in order to prove that TA is part of the tree, the siblings of TA may be used to recompute all the tree, and check if the items match. Indeed, with H(TS) and H (H(TX) ∥ H(TZ)), it is easy to recompute the original root hash and prove that TA is part of the tree. This item may include information on a corresponding transaction to securely and efficiently store and/or retrieve the same. Using a Merkel tree saves bandwidth and processing activity in microcontrollers and the like, as it is not needed to store and re-provide the entire tree or the entire set of data.

Indeed, the Merkle tree reduces the information needed to send between two units to verify whether data is the same. Instead of exchanging and verifying each byte of information between two computer units needed to calculate the Merkle tree on a collection of data and then traverse the Merkle tree and compare the hash values in the Merkle tree.

The Merkle tree is however lacking the possibility to prove that an item is not part of the tree. This is generally called the Proving Non-Inclusion.

One solution provided in the prior art is using Sparsed Merkle trees. The Sparsed Merkle tree is similar to the Merkle tree, but the contained data is indexed, and each data point is placed at the leaf corresponding to the datapoint's index. In the example of FIG. 1, every datapoint would have for example an ordinate value, such as (A, B, C, D) in place of (TA, TS, TX, TZ) respectively, in FIG. 1. In order to prove that TC is part of the tree or not, the additional check would be on the ordinate index in comparison to TD for example.

BRIEF SUMMARY OF THE INVENTION

An objective of the present invention is to provide additional means for improving the efficiency of the processing of the information on the transactions and, in particular, its storage in a specific database. More specifically, an objective of the present invention is to efficiently handle removal and adding of transactions in a secure and distribute manner. This is inter alia because of the way it is structured it also sorts/orders the hash keys. This makes it fast to search each transaction archive.

In order to meet this objective, the invention relates to a computer-implemented method for processing sets of data for storing and keeping track of the same in a specific network, the method implementing a Sparsed Merkle tree, the method comprising steps for cryptographically hashing the data to obtain hash values of the data;

where applicable, cryptographically hashing consecutive hash values of the data to obtain combined hash values of a first stage;

where applicable, cryptographically hashing combined hash values of a first stage to obtain combined hash values of a second stage;

until obtaining a root hash value.

According to a first aspect, the computer-implemented method is characterized by steps for dividing at least one of the hash values into multiple sections of rim-keys of a given bit-width; and determining leave rim-keys being archive leaves of the Sparsed Merkle tree, and parent rim keys supporting the creation of a subtree.

Advantageously, the method enables to limit the number of subtree contrary to the methods of the prior art making subtrees on all the hash values as long as a root hash value is not obtained. This leads to less processing calculation and less memory used in the processing of the data, because each subtree is a hash calculation.

Moreover, as the hash key of an archive is a hash of the archive and we can do a fast tree search via the rim-keys.

According to other aspects of the method taken individually or combined in any technically possible combination:
- the method comprises creating a subtree on a parent rim-key if an archived data has the same rim-key as the parent rim-key and/or;
- the method comprises dividing multiple hash values, preferably every hash values, into multiple sections of rim-keys of the given bit-width and/or;
- at least one subtree is a vector of hash of a given index and/or;
- the index is the respective rim key and/or;
- the Sparsed Merkle Tree comprises vectors of hashes and/or;
- the data are transactions.

The invention further relates to a system for processing sets of data for storing and keeping track of the same in a specific network, the system comprising means for carrying out the steps of the method according to the invention.

More generally, the invention further relates to a system for processing sets of data for storing and keeping track of the same in a specific network, the system implementing a Sparsed Merkle tree, the system comprising
- means for cryptographically hashing the data to obtain hash values of the data;
- means for cryptographically hashing consecutive hash values of the data to obtain combined hash values of a first stage;
- means for cryptographically hashing combined hash values of a first stage to obtain combined hash values of a second stage;
- means for obtaining a root hash value.

According to a first aspect, the system is characterized by
- means for dividing at least one hash value into multiple sections of rim-keys of a given bit-width; and
- means for determining leave rim-keys being archive leaves of the Sparsed Merkle tree, and parent rim keys supporting the creation of a subtree.

The advantages mentioned above for the method also apply to the system implementing the method.

According to other aspects of the system taken individually or combined in any technically possible combination:
- the system comprises means for creating a subtree on a parent rim-key if an archived data has the same rim key as the parent rim-key and/or;
- the system comprises means for dividing multiple hash values, preferably every hash values, into multiple sections of rim-keys of the given bit-width and/or;
- at least one subtree is a vector of hash of a given index and/or;
- the index is the respective rim key and/or;
- the Sparsed Merkle Tree comprises vectors of hashes.

The invention also concerns a database comprising means for storing and keeping track, in a specific network, of sets of data processed through a method according to the invention, or by means of a system according to the invention.

More generally, the invention also concerns a database for storing and keeping track of sets of data in a specific network, implementing a Sparsed Merkle tree, comprising
- hash values of the data obtained by cryptographically hashing the data;
- combined hash values of a first stage obtained by cryptographically hashing some of the consecutive hash values of the data;
- combined hash values of a second stage obtained by cryptographically hashing some of the combined hash values of a first stage;
- a root hash value characterized by
- rims-keys of a given bit-width obtained by dividing at least one hash value into multiple sections of rim-keys; and
- among which are leave rim-keys being archive leaves of the Sparsed Merkle Tree, and parent rim keys supporting the creation of a subtree.

The advantages mentioned above for the method and the system also apply to the database including the corresponding data.

Another object of the invention is a network comprising one or more central unit, in particular one or more computerized central unit, and connection to additional command units implementing transactions, in particular computerized command units, the central unit(s) comprising a system according to the invention and a database according to the invention.

BRIEF DESCRIPTION OF THE SEVERAL VIEWS OF THE DRAWINGS

The invention will now be presented in details via the description of non-limitative embodiments of the invention, and based on the enclosed drawings.

FIG. 2A is a schematic view of an illustration of an example of a Section hierarchical Sparsed Merkle Trees in a method according to an embodiment of the invention.

FIG. 2B is a schematic view of an illustration of a Sparsed Merkle Trees vector of the method illustrated in FIG. 2A.

DETAILED DESCRIPTION OF THE INVENTION

Figure 1:
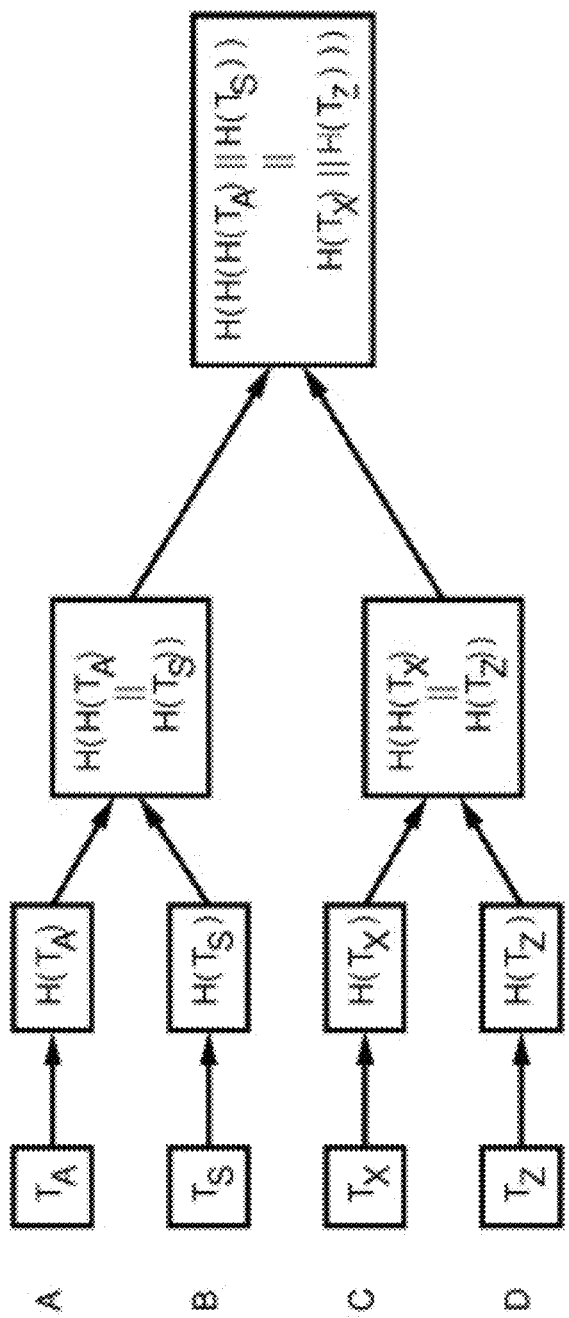
FIG. 1 is a schematic view of an illustration of a Sparsed Merkle Tree in a method according to the prior art.

The invention relates to management and storage of databases, in particular for databases of transactions, such as those relating to cryptocurrencies. The invention finds applications in blockchain transactions and the like.

The invention relates more particularly to storing and keeping track of transactions in a specific network.

The invention aims first at managing high numbers of transactions in a secure way, in order to have a safe and optimal storage of the data.

The invention further aims at overcoming the lack of the solutions of the prior art, and in particular at improving the efficiency of the processing of the information on the transactions and, more particularly, its storage in a specific database.

More specifically, the invention aims at efficiently removing and adding transactions in a secure and distribute manner. More generally the invention relates to a CRUD (create, read, update, delete) DHT (Distribute Hash Table) system.

The invention concerns a computer-implemented method for processing sets of data for storing and keeping track of the same in a specific network. The method is based on implementing a Sparsed Merkle Tree. The Sparsed Merkle Tree as such is known to the person skilled in the art. Thus, the description will focus on the innovative features and not much on the detailed features of the prior art.

The invention is implemented in a computer based system 1a that enables a Distribute Archive of Random Transactions. Thus, the system may be called the DART system, and the method, the DART method.

The method of the invention comprises a step for cryptographically hashing the data to obtain hash values of the data. The hash values obtained are then also hashed, and so on until a root hash value is obtained. It is preferably consecutive hash values of the Sparsed Merkle tree that are hashed. The hash value obtained may be labeled as combined hashed value of the first stage. Then, a similar step is implemented to obtain combined hash values of the second stage, and so on, until the root hash value is obtained.

The data are in particular relating to transactions. More particularly, each transaction is stored in the DART system as a distribute hash-table using a crypto-graphic hash of the transaction T data. This means that each transaction is identified by a unique hash value h. The transaction is put into a table order via the numerical value of the hash.

In a preferred embodiment, the h value may be obtained by the formula:

$$h = H(T), h \in [0:2^{N-1}-1], N \in \mathbb{N} \quad \text{Equation 1}$$

Wherein
H is cryptography hash function,
N represents the number of bits of the hash value h.
Then $$h = \sum_{i=0}^{N-1} b_i 2^i b_i \in \{0, 1\} \quad \text{Equation 2}$$

wherein the bi sad is the i'th bit of the hash value h.

According to a first aspect, the method of the invention comprises a step for dividing at least one of the hash values into multiple sections of rim-keys (L, A) of a given bit-width. The method further comprises a step for determining leave rim-keys L being archive leaves of the Sparsed Merkle tree, and parent rim keys A supporting the creation of a subtree (SMT).

Advantageously, the method enables to limit the number of subtrees that are made on the Sparsed Merkle tree. Indeed, contrary to the methods of the prior art making subtrees on all the hash values as long as a root hash value is not obtained, in the invention only some rim keys become leaves and others are bases of subtrees. This leads to less processing calculation and less memory used in the processing of the data.

In particular, the hash-table is divided m into sections S. Each section contains an ordered list of hash-values within a limited range as in the following formula of a preferred embodiment, such that the sections are buildup of a hierarchy of Merkle-Trees divided in what is called rims.

$$S = \sum_{i=0}^{M-1} b_i 2^i, S \in [0:2^M - 1], m = 2^M \quad \text{Equation 3}$$

The method of the invention further comprises a step for determining leave rim-keys being archive leaves of the Sparsed Merkle tree, and parent rim keys supporting the creation of a subtree.

In particular, the bit-width of a rim is for example K. Each leave in the tree is expressed via a rim-index called the rim-key. The maximum number of branches is defined as k, and thus:

$$k = 2^K \quad \text{Equation 4}$$

If the sections bit-width M is selected as cardinal multiple C number of K, the rim key can be expressed as:

$$R_n = \sum_{i=0}^{K-1} b_{nK+i} 2^i \quad \text{Equation 5}$$

The section can be expressed as the first C rim-keys.

$$S = \sum_{j=0}^{C-1} R_j \quad \text{Equation 6}$$

From this the hash value h can be composed as:

$$h = S + \sum_{j=C}^{G-1} R_j = \sum_{j=0}^{G-1} R_j, N = KG \quad \text{Equation 7}$$

FIGS. 2A and 2B may be used to illustrate an embodiment of the invention. They show an example of a Section hierarchical Sparsed Merkle Trees. The rims are labeled R_C for the rim C, R_C+1 for the following rim.

When a transaction is stored in the DART system the hash value h is calculated and the hash value is divided into sections of rim-keys (L, A).

According to a preferred embodiment the Sparsed Merkle Tree comprises vectors of hashes. More particularly, each sub-tree is represented by vector table the index into the vector is the rim-key of the respective rim. Vectors of hashes are very efficient means in the implementation of the invention.

Indeed, the subtree is a small hash of the vector that is fast to calculate. And even faster of the vector is spares (most null value). The deeper we go in the tree the more sparsed the subtree vectors are. With the current implementation we are working in rim 3, and rim 3 only have few no null elements with more than $100^6$ archives.

According to an embodiment, the method comprises creating a subtree (SMT) on a parent rim-key A if an archived data has the same rim-key as the parent rim-key A.

More particularly, if an existing archived transaction has the same rim-key a sub-tree must be created.

If the rim-key is different from an already archive transaction the archive is stored in the vector-table with the current rim-key. This is an efficient way to limit the number of subtrees.

Moreover, the hash can be calculated from the archived data. In our implementation a vector element can either contain a hash of the including subtree branch; or the archived data.

It is preferable to have the minimum number of nodes to store in one complete sector.

In our implementation, the vector also includes an index pointer which points to a record on the disk. The Sector rims are stored in memory and all the sectors sub-trees are store on the local disk space.

In FIG. 2A, a hierarchical tree structure is shown. The white boxes A are hash values of the Sparsed Merkle Tree. The hatched boxes are archive leaves L. The circles are subtrees of the Sparsed Merkle Tree. FIG. 2B illustrates the SMT vector.

Figures 2C, 3A:
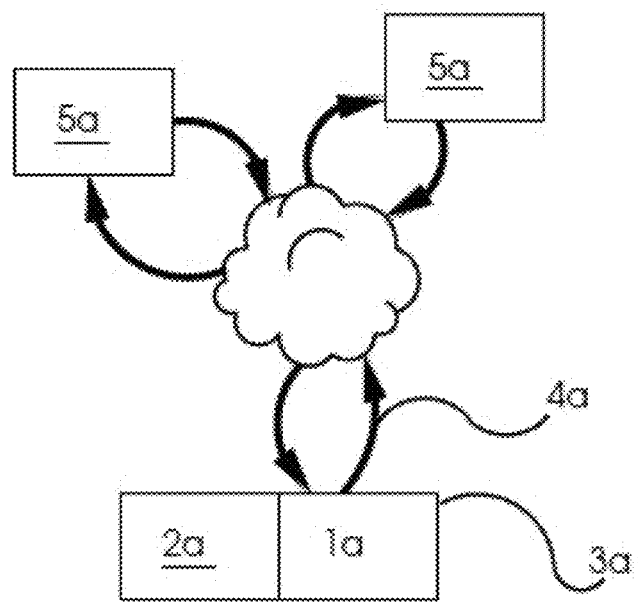
FIG. 2C is a schematic view of an illustration of a system according to an embodiment of the invention.
FIG. 3A is a schematic view of an illustration of a list of transactions with hash values.
Figure 3B:
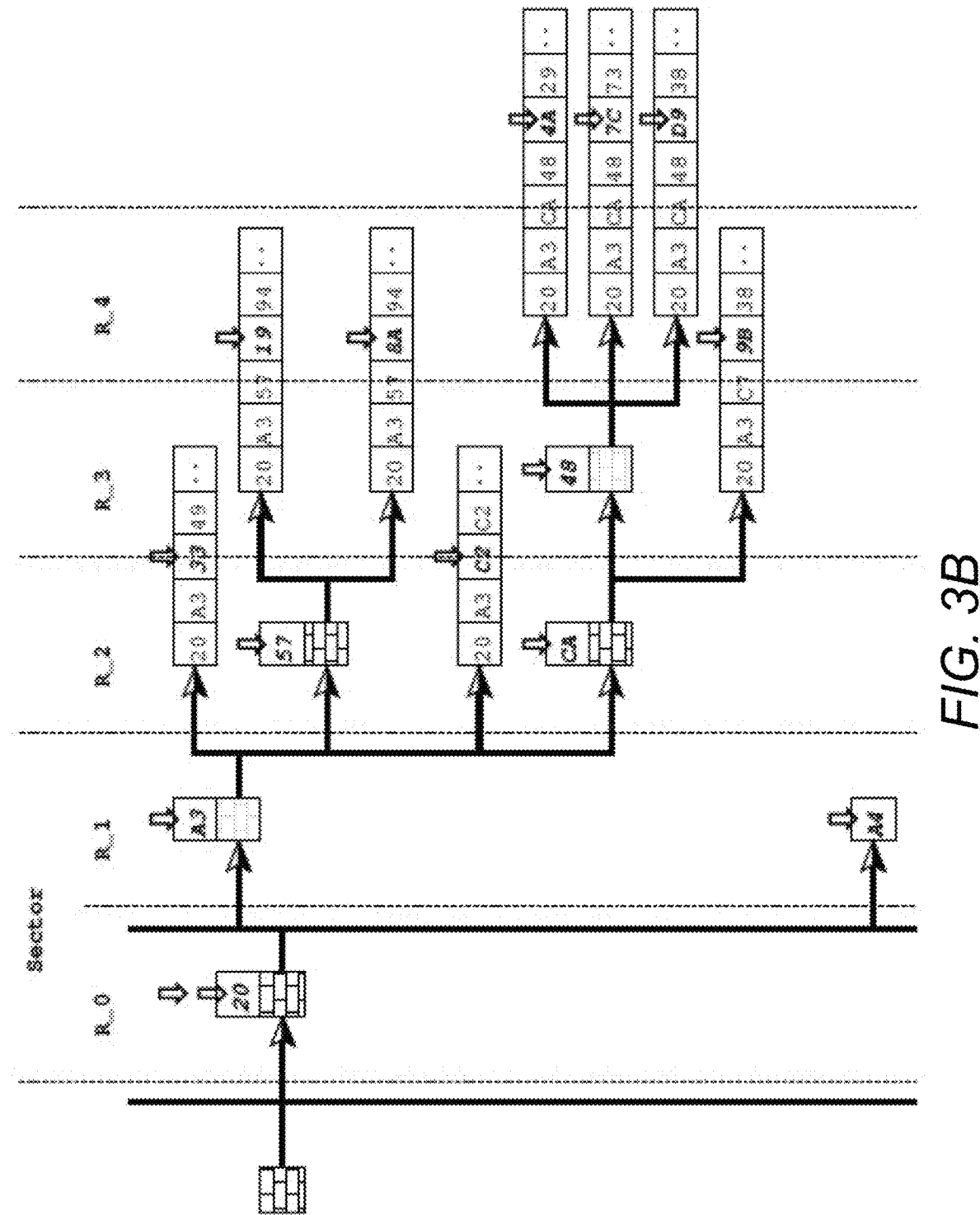
FIG. 3B is a schematic view of an illustration of an example of how the transactions of FIG. 3A are archived in the hierarchical sub-trees.

An example illustrated in FIGS. 3A and 3B, shows how a list of transaction is archived into the tree structure.

Because most modern computes are based on multiple 8-bits (bytes) k=8 in this example and C=2.

Supposing a list of transactions is given with the hash values listed in FIG. 3A. In the figure, the arrows point to a branch or an Archive. If the rim split is a branch if not it's an archive. An archive is a Leave. In the drawing a brick-dashed symbol means a branch hash. If there is none it means that in an archive the hash is calculate from data in the archive.

FIG. 3B shows where the transaction archives are placed in the tree structure.

In FIG. 3B, the hatched squares are hash values of the SMT of a sub-branch; the other squares are Brance rim keys. The sub-tree vector element can contain a Brance (which points to a subtree) or an archive which contains the data of the archive. The rims are labeled R_O for the first rim, R_1 for the following rim.

As it is noted before the trees are divided into sections which are defined as the first C rims. In the section rims no transaction leaves are allowed. Transactions must be archived in rim greater than C. This rule makes it easier to split the database up into a distributed database.

Figure 4:
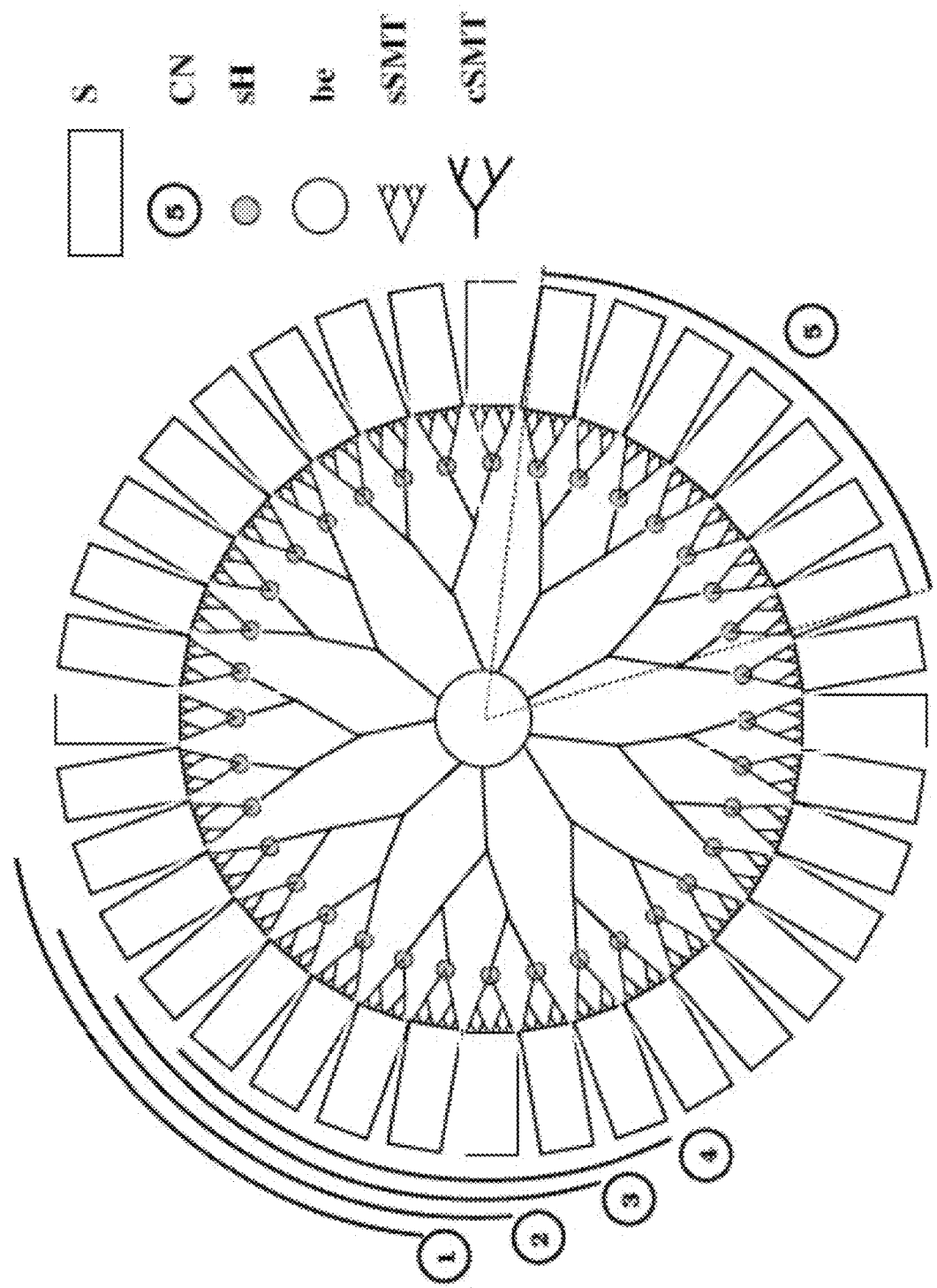
FIG. 4 is a graphical illustration of the database according to an embodiment of the invention.

The complete database can be illustrated as a circular structure as shown in FIG. 4. Each black rectangle represents the structure shown in FIG. 2A and all the center of the data shows the Merkle tree for the whole data base.

The database can be distributed between computer nodes CN in the flowing manner as a large hashtable where the hash-value h is key index key to the hash-table.

The hash-table is distributed between the computer nodes connected via a network, where each node manages a sample of sections called a DART angle.

Because the numerical value of the hash's is ordered around the circle.

For example, the maximum value of 256 hashes is $2^{256}-1$.

The number rolls around from $2^{256}-1$ to 0. This mean it can be plotted on a circle.

A section is to be managed by more than Q nodes to keep redundancy and security of the data.

Each node must maintain the database sections within nodes section angle, this means adding and removing the transaction and update the Merkle-Tree root of the section hash the Merkle root of the DART is named bullseye.

An example of the DART is shown in FIG. 4 illustrated. The archives (transactions) are stored in a hierarchical tree structure. The archives are stored as the leaves of the tree. CN refer to the node with their number. "sSMT" refer to sector Merkle trees. "cSMT" refer to central Merkle trees. "sH" refer to Sector Hash. "be" refer to a bullseye.

Regarding now, the Sparsed Merkle Tree itself, due to the structure of the SMT the Merkle root of the complete DART can be calculate with very few hash operations compared to full Merkle tree.

In the flowing the method is describe how to calculate the Merkle tree in an efficient manner.

The function below defines hash function of two value pairs.

$$\chi(y_L, y_R) = \begin{cases} 0 & \text{for } y_L = 0 \land y_R = 0 \\ y_L & \text{for } y_R = 0 \land y_L \neq 0 \\ y_R & \text{for } y_L = 0 \land y_R \neq 0 \\ H(y_L \| y_L) & \text{for others} \end{cases} \quad \text{Equation 8}$$

This definition is important because this is what makes the calculation of the hash very fast on highly sparsed vector because most of the elements is null and on null element you don't do any calculations. It also illustrated in the examples below.

The Sparsed Merkle Tree is can be represented as a vector of hashes as previously described where some of the value in the vector often is zero.

$$V_{(m,n)}|_{m<n} = [h_m, h_{m+1}, \ldots, h_{n-1}] \quad \text{Equation 9}$$

Hash function of the vector can be defined as:

$$\Xi(V_{(0,k)}), = \begin{cases} \chi(\Xi(V_{(0,k/2)}), \Xi(V_{(k/2+1,k)})) & \text{for } k > 2 \\ \chi(h_0, h_1) & \text{others} \end{cases} \quad \text{Equation 10}$$

The function $\Xi$ is of tree vector is defined as the Sparsed Merkle root hash value.

Examples of some $\Xi$ calculations.

EXAMPLE 1

The $\Xi$ value of a null vector will result in the value 0 which also proves that the SMT is empty.

EXAMPLE 2

If the vector $V_{(0,k)}$ only have one value hi which none zero then the value $\Xi$ will be hi.

$$\Xi(V_{(0,k)})^2|_{i \in [0..k-1]} = V_{(0,k)} \cdot V_{(0,k)} = h_i^2 \cdot h_j|_{j=i} \neq 0 \land h_j|_{j=i} = 0$$
$$\land j \in [0..k-1] \quad \text{Equation 11}$$

EXAMPLE 3

If the vector $V_{(0,k)}$ only contains two and only two none zero value hi and hj the $\Xi$ can be expressed as:

$$\Xi(V_{(0,k)})|_{i<j \land j \in [0 \ldots k-1]} = \chi(h_i, h_j) \quad \text{Equation 12}$$
$$= H(h_i \| h_j),$$

$$h_l|_{l=i \lor l=j} \neq 0 \land h_l|_{l \neq i \land l \neq j} = 0 \land l \in [0 \ldots k-1]$$

EXAMPLE 4

$$\begin{aligned}\Xi(V_{(0,8)}) &= \Xi([h_0, h_1, 0, 0, h_4, 0, h_6, 0]) \\ &= \chi(\Xi([h_0, h_1, 0, 0]), \Xi([h_4, 0, h_6, 0])) \\ &= \chi(\chi(\Xi([h_0, h_1]), \Xi([0, 0])), \chi(\Xi([h_4, 0]), \Xi([h_6, 0]))) \\ &= \chi(\chi(\chi(h_0, h_1), 0), \chi(\chi(h_4, 0), \chi(h_6, 0))) \\ &= \chi(\chi(h_0, h_1), \chi(h_4, h_6))\end{aligned}$$

Equation 13

This results in the following hash value

~~Equation 14~~

As an example, to compare normal Merkle tree calculations to the SMT method and example of $4 \cdot 10^9 \approx 2^{32}$ archives stored in the database. This will would in worst case amount to $4 \cdot 10^9$ hash operations.

With a good probability and archive would be store at rim 4 and an archive stored a rim 4 would about to around $4 \cdot 256 \approx 1000$.

The invention further concerns a system 1a for implementing the method as described above. The system 1a is a computerized system and comprises inherent hardware and software modules configured to implement the method described above. This may be called a DART system 1a. The system enables to process sets of data for storing and keeping track of the same in a specific network, the system comprising means for carrying out the steps of the method according to the invention.

The system comprises means for cryptographically hashing the data up to the obtention of a root hash value. These means include one or more microcontrollers, hardware and software modules that are known as such to the skilled person, but are however configured to implement the specific Sparsed Merkle tree of the invention.

According to a first aspect, the system comprises
means for dividing at least one hash value into multiple sections of rim-keys of a given bit-width; and
means for determining leave rim-keys being archive leaves of the Sparsed Merkle tree, and parent rim keys supporting the creation of a subtree.

The system is configured to execute the corresponding operation(s) through the microcontroller and software and hardware modules.

The advantages mentioned above for the method also apply to the system implementing the method.

The invention relates also to a database 2a comprising means for storing and keeping track, in a specific network, of sets of data processed through a method as described above, or by means of a system as described above. This may be called a DART database 2a. The database include one or more microcontrollers, hardware and software modules that are known as such to the skilled person, but are however configured to implement the invention.

More generally, the database comprises hash values of all the data of one or more Sparsed Merkle tree(s) all the way to the corresponding root hash value(s).

In addition to that, the database comprises
rims-keys of a given bit-width obtained by dividing at least one hash value into multiple sections of rim-keys; and
among which are leave rim-keys being archive leaves of the Sparsed Merkle tree, and parent rim keys supporting the creation of a subtree.

The advantages mentioned above for the method and the system 1a also apply to the database including the corresponding data.

Another object of the invention is a network comprising one or more central unit(s) 3a, in particular one or more computerized central unit, and connection(s) 4a to additional command units 5a implementing transactions, in particular computerized command units, the central unit(s) 3a comprising a system 1a and a database 2a as described above. This may be called a DART network. The network may be connected via the internet to the additional command units.

I claim:

1. A computer implemented method for processing sets of data for storing and keeping track of the same in a specific network, the method implementing a Sparsed Merkle tree, the method comprising:
cryptographically hashing the data to obtain hash values of the data;
cryptographically hashing consecutive hash values of the data to obtain combined hash values of a first stage;
cryptographically hashing combined hash values of a first stage to obtain combined hash values of a second stage;
obtaining a root hash value,
being comprised of the steps of:
dividing at least one of the hash values into multiple sections of rim-keys of a given bit-width;
limiting a predetermined number of the subtrees that are made on the Sparsed Merkle tree; and
determining leave rim-keys being archive leaves of the Sparsed Merkle tree, and parent rim-keys supporting the creation of subtrees,
wherein at least one subtree of the subtrees comprises more than two branches, and
wherein at least one subtree of the subtrees is a vector of a cryptographic hash of a given index.

2. The computer implemented method according to claim 1, further comprising a step of: creating the subtree on a parent rim-key if an archived data has the same rim-key as the parent rim-key.

3. The computer implemented method according to claim 1, further comprising a step of: dividing multiple hash values of the hash values into multiple sections of rim-keys of the given bit-width.

4. The computer implemented method according to claim 1, wherein the given index is a respective rim-key.

5. The computer implemented method according to claim 4, wherein the Sparsed Merkle Tree comprises vectors of hashes.

6. The computer implemented method according to claim 1, wherein the data are transactions.

7. A system for processing sets of data for storing and keeping track of the same in a specific network, the system comprising one or more microcontrollers, hardware and software modules configured to implement a Sparsed Merkle tree by implementing:
cryptographically hashing the data to obtain hash values of the data;
cryptographically hashing consecutive hash values of the data to obtain combined hash values of a first stage;
cryptographically hashing combined hash values of a first stage to obtain combined hash values of a second stage;
obtaining a root hash value;
dividing at least one hash value into multiple sections of rim-keys of a given bit-width;
limiting a predetermined number of the subtrees that are made on the Sparsed Merkle tree; and determining leave rim-keys being archive leaves of the Sparsed Merkle tree, and parent rim-keys supporting the creation of subtrees, wherein at least one subtree of the subtrees comprises more than two branches, and wherein at least one subtree of the subtrees is comprised of a vector of a cryptographic hash of a given index.

8. The system, according to claim 7, further being configured to create the subtree on a parent rim-key if an archived data has the same rim-key as the parent rim-key.

9. The system, according to claim 7, further being configured to divide multiple hash values of the hash values into multiple sections of rim-keys of the given bit-width.

10. The system, according to claim 7, wherein the given index is comprised of a respective rim-key.

11. The system, according to claim 10, wherein the Sparsed Merkle Tree comprises vectors of hashes.

12. A network, comprising:
a central unit being a computerized central unit, and
a connection to additional command units implementing transactions, said additional command units being computerized command units, wherein said central unit is further comprised of the system according to claim 7 and a database, wherein said database comprises:

the hash values of the data obtained by cryptographically hashing the data;

the combined hash values of a first stage obtained by cryptographically hashing some of the consecutive hash values of the data;

the combined hash values of a second stage obtained by cryptographically hashing some of the combined hash values of a first stage;

the root hash value;

the rim-keys of the given bit-width obtained by dividing at least one hash value into multiple sections of rim-keys, at least some rim-keys being leave rim-keys being archive leaves of the Sparsed Merkle tree;

the limited predetermined number of the subtrees that are made on the Sparsed Merkle tree; and the parent rim-keys supporting the creation of the subtrees.

* * * * *